United States Patent [19]
Tanaka

[11] 3,741,096
[45] June 26, 1973

[54] FILM MAGAZINE

[75] Inventor: Harumi Tanaka, Ikuta-ku, Kobe-shi, Japan

[73] Assignee: Minolta Camera Kabushiki Kaisha, Osaka-shi, Japan

[22] Filed: Mar. 16, 1971

[21] Appl. No.: 124,873

[30] Foreign Application Priority Data
Mar. 16, 1970 Japan.............................. 45/22535

[52] U.S. Cl. .............................. 95/31 CA, 95/31 FS
[51] Int. Cl. ...................................... G03b 17/26
[58] Field of Search...................... 95/31 FS, 31 CA, 95/31

[56] References Cited
UNITED STATES PATENTS

| | | | |
|---|---|---|---|
| 3,523,496 | 8/1970 | Nerwin.............................. | 95/31 FS |
| 3,490,348 | 1/1970 | Kenji Ariyasu et al............ | 95/31 FS |
| 3,386,357 | 6/1968 | Kremp et al.................... | 95/31 FS X |
| 3,364,831 | 1/1968 | Kremp et al..................... | 95/31 FS |
| 3,266,397 | 8/1966 | Kremp et al...................... | 95/31 FS |
| 3,159,357 | 12/1964 | Berlings......................... | 95/31 FS X |

*Primary Examiner*—Joseph F. Peters, Jr.
*Attorney*—Watson, Cole, Grindle & Watson

[57] ABSTRACT

The main body of a film magazine for a camera is of uniform shape, the shape of a connecting member which is mounted detachably on the film magazine is variable in accordance with the sensitivity of the film charged in the film magazine. The film magaine is composed of a container body and a cover body and are retained together by the connecting member. An automatic exposure mechanism provided in a camera adapted to receive the film magazine is adjusted in accordance with the sensitivity of the film used by detecting the shape of the connecting member by a detecting member provided in the camera. Mass-production of magazines is facilitated by fixing the shape of the main body of the film magazine regardless of the sensitivity of the film charged.

7 Claims, 8 Drawing Figures

PATENTED JUN 26 1973　　　　　　　　　3,741,096

INVENTOR.

BY Harumi Tanaka

Watson, Cole, Grindle & Watson

PATENTED JUN 26 1973

INVENTOR.

BY Harumi Tanaka

Watson, Cole, Grindle & Watson

3,741,096

FILM MAGAZINE

BACKGROUND OF THE INVENTION

The present invention relates to a film magazine and more particularly relates to a film magazine in which the shape of the main body of the film magazine is fixed, and the shape of an accessory thereof is variable in accordance with the sensitivity of a film charged therein, and the automatic exposure control mechanism provided in a camera is adjustable in accordance with the sensitivity of the film used.

Hitherto, in a camera provided with an automatic exposure control mechanism it has been known to control automatically said exposure control mechanism in accordance with the sensitivity of the film and control automatically the proper exposure in accordance with said film sensitivity. And in this case it is known that near the end of the film there is provided a notch or the like in accordance with the film sensitivity, and the detecting member provided in the camera detects said notch to sense the film sensitivity so as to control the automatic exposure control mechanism provided in the camera in accordance with the film sensitivity. In such arrangement it suffices to provide only a notch on the film, so that it is easy to indicate the film sensitivity; however, said notch may cause breakage of the film, and on account of the pliability of film the transmission of the information of the film sensitivity to the detecting member provided in the camera is often inadequate and a faulty operation is apt to take place.

It is also possible to change the shape of the film magazine itself so as to provide a peculiar notch portion in accordance with the film sensitivity and transmit an indication of the film sensitivity to the detecting member. In this case the transmission of the information of the film sensitivity is positively carried out; however, the shape of the film magazine must be changed in accordance with the film sensitivity so that the mass-production of film magazines is hampered and film magazines which are thrown away after using are expensive.

OBJECTS OF THE INVENTION

One object of the present invention is to provide a film magazine in which the prior drawbacks mentioned above are removed, and the shape of the main body of the film magazine is fixed, whereas by changing the shape of a detachable accessory the film sensitivity information can be transmitted to the detecting member provided in the camera.

Another object of the present invention is to provide a film magazine in which the shape of a detachable connecting member, which connects the container body to the cover body of the film feeding chamber or film winding chamber composed of the film container body and the cover body, for accommodating the film, is variable in accordance with the film sensitivity, and thereby the film sensitivity information can be transmitted to a detecting member provided in a camera.

The other objects of the present invention will be clear from the description of the embodiments disclosed hereinafter.

SUMMARY OF THE INVENTION

In order to attain the above-mentioned objects the film magazine main body comprises a container body and a cover body, and a connecting member detachably mounted on the magazine main body so as to connect said container body to said cover body. The connecting member is variable in shape in accordance with the sensitivity of a film charged in said magazine, and thus the film sensitivity information can be transmitted.

DESCRIPTION OF THE PREFERRED EMBODIMENTS

Figure 1:
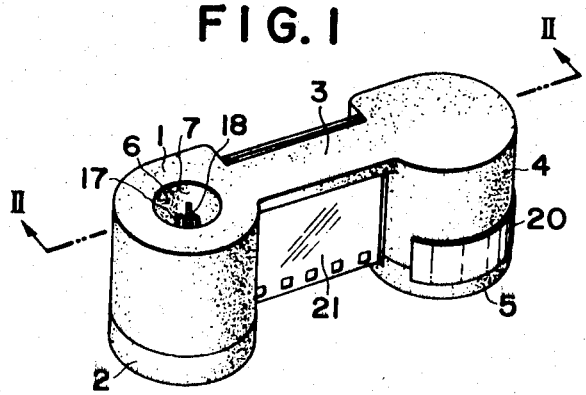
FIG. 1 is a perspective view of an embodiment of the present invention for a 16 mm. film, and charged with a film.
Figure 2:
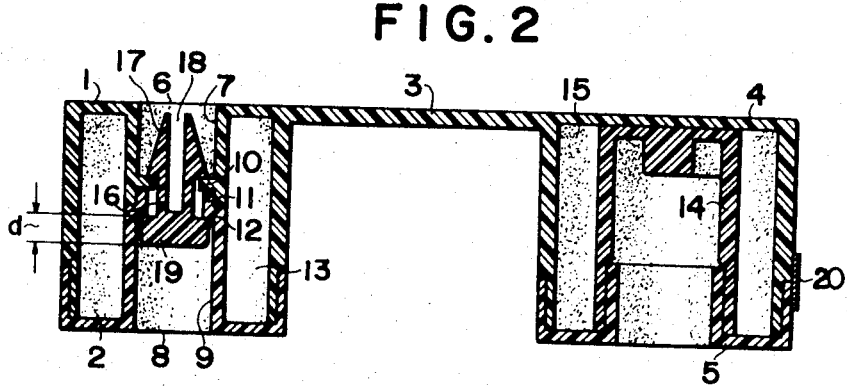
FIG. 2 is a front view in longitudinal section taken along line II—II' in FIG. 1, the film being absent.

FIG. 1 and FIG. 2 show an embodiment of a film magazine for a 16 mm camera in accordance with the present invention.

The film magazine main body comprises a container body including a casing member 1 forming a film feeding chamber and casing member 4 forming a film taking-up chamber which are connected strongly with each other by means of bridge 3 as shown in FIG. 1, said casing members 1, 4 of both chambers being respectively provided with cover bodies 2, 5. Film 21 not yet exposed is charged in casing member 1 on the feeding side and is drawn out of the light-tight channel thereof not shown in the drawing, and in the same manner the tip thereof enters the light-tight channel on the taking-up side into casing member 4, and both members 1, 4 are respectively covered with cover bodies 2, 5.

As shown in FIG. 2, the external bottom face of casing member 4, namely, the taking up chamber, is flat, and shaft sleeve 14 is provided concentrically therein. Cover body 5 is formed into a channel-section cylindrical body and fitted on shaft sleeve 14 and the external cylinder of casing member 4 to form taking-up chamber 15, and casing member 4 and cover body 5 are held together by, for example, black adhesive tape 20 and at the same time the light from the outside is prevented from coming in through the connection.

On the film feeding side, on the center of the bottom face of casing member 1 there is formed internal cylinder wall 7 for constituting opening 6, and on said internal cylinder wall 7 there is provided annular flange 10 projected inwardly in the radial direction in opening 6.

In the same manner, also on cover body 2 there is formed internal cylinder wall 9 for constituting opening 8 of nearly the same diameter as that of said opening 6, and the tip portion of said internal cylinder wall 9 is reduced to a smaller diameter cylinder 11 so as to form annular shoulder portion 12, and when cover body 4 is fitted on casing member 1 the end face of said smaller diameter cylinder 11 comes into contact with said flange 10.

Figure 3:
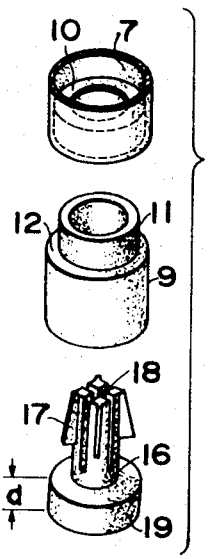
FIG. 3 is an exploded perspective view showing the connection of the connecting member and the container body and the cover body of the film magazine main body in said embodiment.

A connecting member inserted into said opening 8 is made of an elastic material such as plastic and formed into the shape which is shown in FIG. 3. Extending from the tip of the head into shaft portion 16, a cross-shaped slot 18 is formed, and on the head portions there are integrally formed triangular pieces respectively divided by said slot 18 and having a vertical angle relative to the shaft portion 16, and the diameter of said shaft portion 16 is a little smaller than the inside diameter of the opening of said annular flange 10, and the base of said triangular piece 17 is larger than the inside diameter of the opening of said annular flange 10 but smaller than the outside diameter of said annular flange 10, namely, the diameter of internal cylinder wall 7. On the other end of shaft portion 16 there is intergrally formed base plate 19 of which the outside diameter is larger than the inside diameter of said shoulder portion 12 and smaller than the diameter of the opening of internal cylinder wall 9, and the thickness d of said bottom plate is variable in accordance with the sensitivity of a film to be charged, and may be prepared for several kinds.

Therefore, after a film is charged between the internal wall and the external wall of casing member 1, cover body 2 is applied, and the tip of smaller diameter cylinder 11 comes into contact with annular flange 10. Upon inserting and pushing the connecting member, having bottom plate 19 of thickness d corresponding to said film sensitivity, into opening 8 from the head thereof, triangular piece 17 passes through the central opening of annular flange 10 while compressing slot 18, and through the elasticity thereof the bottom face of triangular piece 17 opens on annular flange 10 and bottom plate 19 comes into contact with shoulder portion 12, and accordingly casing member 1 and cover body 2 are tightly and permantly coupled.

Figure 4:
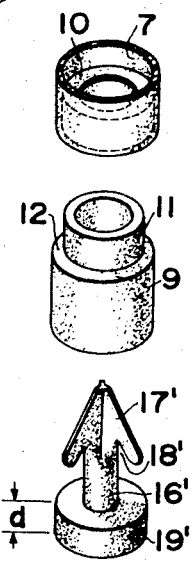
FIG. 4 is an exploded perspective view of another embodiment.

Another embodiment of said connecting member is shown in FIG. 4. In this embodiment, instead of said slot 18 extending from the tip to the shaft portion, on the base face of triangle piece 17' a slot is formed in the shape of an arrow and the outside diameter of said triangle piece 17' can be elastically reduced so as to pass through the central opening of annular flange 10 to come into contact with it, and the other parts are the same as those in the embodiment shown in FIG. 3.

Figure 5:
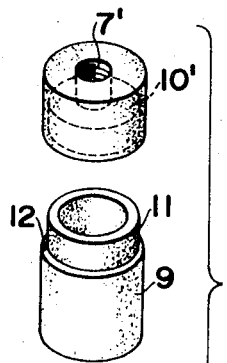
FIG. 5 is an exploded perspective view of another embodiment.

In the embodiment shown in FIG. 5, annular flange 10 is thickened, and on the upper portion of internal cylinder wall 7 thread 7' is formed, into which thread 17'' provided on tip of the connecting member having bottom plate 19'' is screwed. In this embodiment, the film sensitivity information can be furnished by washer 18''fitted on said shaft 16'' without changing base plate 19''. And, in this embodiment, manufacturing the connecting member is very easy but the coupling operation involves some trouble because the of screwing operation.

Figure 6:
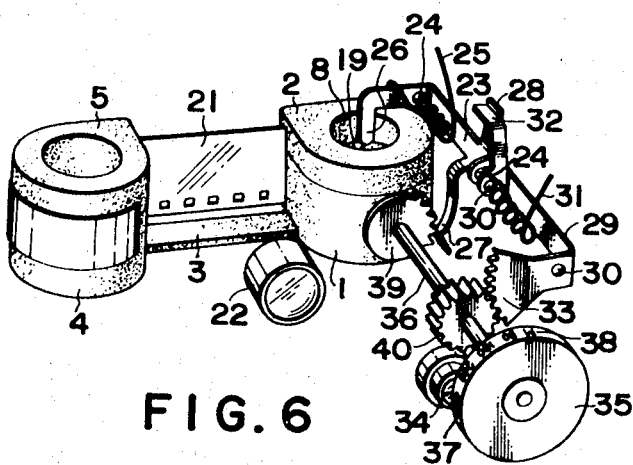
FIG. 6 is a perspective view showing a detecting member provided in a camera body for detecting the film sensitivity in accordance with the present invention, and a mechanism which controls the automatic exposure control device in the camera by means of said information.
Figure 7:
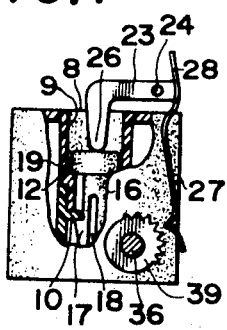
FIG. 7 is a side view showing how the film sensitivity information is automatically transmitted by the magazine in accordance with the present invention.
Figure 8:
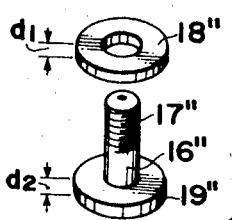
FIG. 8 is a side view showing how the mechanism is operated so as to set up manually the film sensitivity information.

With reference to FIGS. 6 to 8, the embodiment of the mechanism which is, as described above, capable of detecting the film sensitivity information indicated by the bottom plate or the washer of the connecting member in the film magazine now will be described. FIG. 6 shows the film magazine normally installed in a camera, when it is upside down in contrast with FIG. 1 and FIG. 2. In the central opening 8 of cover body 2 of the magazine, on the film feeding side, bottom plate 19 of the connecting member is positioned at the depth predetermined in accordance with the film sensitivity. Reference numeral 23 designates a detecting lever supported at pin hole 24 on the camera body and given a counter-clockwise turning tendency by strong spring 25, the tip of detecting arm 26, bent vertically comes into contact with bottom plate 19 in opening 8 to detect the film sensitivity information based on the thickness of bottom plate 19. Said detecting lever 23 is provided with restraining arm 28 and detent arm 27.

On an axis nearly on an extension of the turning axis for said detecting lever 23, operating lever 29 is pivotally supported at pin holes 30, 30 and is given a counter-clockwise turning tendency by spring 31 which is weaker than said spring 25, and arm 32 thereof engages with restraining arm 28 of said detecting lever 23. Operating lever 29 is provided with toothed sector 33. On spindle 36, rotatably supported on the camera body stage, a variable density filter 35 of disk shape is fixed, and adjacent said filter 35 there is disposed photoreceiving element 34 of an exposure meter having its optical axis nearly that of objective lens 22. On the edge of said disk-shaped filter 35, ASA scale 37 of 50.100.200.400 and manual film sensitivity set up scale "M", designated by numeral 38, are inscribed.

Pinion gear 40 fixed to said spindle 36 meshes with said toothed sector 33, and to said spindle 36 there is fixed toothed disk 39 for engaging with detent arm 27 of said detecting lever 23.

The turning angle of detecting lever 23 is governed in accordance with the film sensitivity indicated by the thickness of base plate 19, as described above, and according to the turning of detecting lever 23 the turning angle of operating lever 29 also is determined and in response to this angle said sector 33 turns pinion gear 40 and variable density filter 35. Accordingly, the light quantity of the object light ray impinging on photoreceiving element 3, in accordance with the film sensitivity, undergoes a change and the exposure meter or the automatic exposure control device is adjusted in accordance with the sensitivity of the film used.

When using a film magazine which is not provided with a connecting member for indicating the film sensitivity that film magazine is not provided with central opening 8, so that detecting arm 26 is turned clockwise to the height of the cover body as shown in FIG. 8, and detent arm 27 thereof engages toothed disk 39 in such a way that the letter M of manual film sensitivity set up scale 38 is displayed. The automatic turning of disk-shaped density filter 35 is eliminated, so that in this case by manually turning the disk, the sensitivity of the film used is compensated. In this case, sector 33 is out of mesh with pinion gear 40.

When using a film magazine in accordance with the present invention, which is provided with a connecting member indicating the film sensitivity, detent arm 27 is disengaged from disk 39 as shown in FIG. 7.

In the present invention, the film sensitivity information is transmitted by the connecting member of the container body and the cover body of the film magazine, so that the mass-production of film magazines is facilitated because the shape of the film magazine main body is constant. The present invention is not limited to the described embodiments but can be modified variously without deviating from the spirit thereof.

What is claimed is:

1. A film magazine capable of indicating the sensitivity of the film loaded in said magazine, to be transmitted to an automatic exposure control device for a camera, comprising:
    a container body including a film supply casing member, a film take-up casing member and a bridge connecting said casing members;
    cover members coupled with said film supply casing member and said film take-up casing member to form film chambers;
    a connecting member detachably mounted on one of said film chambers to connect one of said film casing members with one of said cover members in a light-excluding manner, the size of said connecting member being selected in accordance with the sensitivity of the film loaded in said film magazine so as to indicate said film sensitivity.

2. A film magazine as set forth in claim 1, wherein said connecting member is mounted on the film supply chamber so as to connect the film supply casing member with one of said cover members.

3. A film magazine as set forth in claim 1, wherein said connecting member is mounted on the film take-up chamber so as to connect the film take-up casing member with one of said cover members.

4. A film magazine as set forth in claim 1, wherein a film casing member and one of the cover members for constituting a film chamber are each provided with an internal cylinder wall for forming a center opening by being connected to each other, one of said internal cylinder walls having an annular flange projecting inwardly therefrom and the other internal cylinder wall having a shoulder portion and a smaller diameter cylinder formed adjacent said shoulder portion and having an edge adapted to contact with said annular flange, the connecting member comprising a flexible head adapted to pass through said smaller diameter cylinder so as to engage over said annular flange, a shaft portion joining said head and fitting loosely in said small diameter cylinder, and a bottom plate formed on the other end of said shaft portion and engaged with said shoulder, the shape of said connecting member being selectable in accordance with the sensitivity of the film loaded in said film chamber so as to indicate the film sensitivity.

5. A film magazine as set forth in claim 4, wherein the connecting member is made of an elastic material and has a slot extending from the tip of the head into the shaft portion, triangular pieces formed on the head portions divided by said slot and each having an apex on the tip of the head, so that when said triangular pieces are inserted into the central opening of the film chamber said apex passes through the smaller diameter cylinder decreasing the outside diameter of the head by means of said slot, and then over the annular flange to engage therewith, the base plate of said connecting member engaging the shoulder portion of said internal cylinder wall to connect the film casing member to the cover member, the thickness of said base plate being selected in accordance with the sensitivity of the film loaded in said film chamber to indicate the film sensitivity.

6. A film magazine as set forth in claim 4, wherein the connecting member for connecting the film casing member to the film cover member comprises a shaft portion, blade pieces integral with said shaft portion on the tip thereof and made of an elastic material, said blade pieces expanding downwardly, and a base plate formed on the other end of said shaft portion, so that when said connecting member is inserted into the central opening of the chamber said blade pieces pass through the smaller diameter cylinder and the annular flange by decreasing their outside diameter elastically, and engage on said annular flange, said base plate engaging with the shoulder portion to connect the film casing member to the cover member, the thickness of said base plate being selected in accordance with the sensitivity of the film loaded in said film chamber to indicate the film sensitivity.

7. A film magazine as claimed in claim 4, wherein said annular flange is threaded on its internal circumferential surface, said connecting member comprising a shaft portion fitting loosely in said smaller diameter cylinder and having a screw thread formed on the tip of said shaft portion and screwed into said threaded portion of said annular flange, a bottom plate formed on the other end of said shaft portion, and a washer fitted loosely on said shaft portion and having a diameter larger than that of said smaller diameter cylinder, so that when said connecting member is inserted into the central opening and said screw formed on the tip of said shaft portion is screwed into said threaded portion of the annular flange, said washer engages with said shoulder portion to hold said film casing member and said cover member tightly together, the thickness of said washer and said bottom plate of said connecting member indicating the film sensitivity of a film loaded in said film chamber.

* * * * *